(12) United States Patent
Arbesman

(10) Patent No.: US 6,431,331 B1
(45) Date of Patent: *Aug. 13, 2002

(54) BRAKE PLATE AND METHOD AND APPARATUS FOR MANUFACTURING SAME

(75) Inventor: Ray Arbesman, 42 Burton Road, Toronto, Ontario (CA), M5P 1 V2

(73) Assignee: Ray Arbesman, Scarborough (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/614,015

(22) Filed: Jul. 11, 2000

Related U.S. Application Data

(63) Continuation-in-part of application No. 09/507,065, filed on Feb. 18, 2000.

(51) Int. Cl.$^7$ .............................................. F16D 69/00
(52) U.S. Cl. .............................. 188/250 G; 192/107 M
(58) Field of Search ......................... 188/250 G, 251 R, 188/251 A, 258; 192/107 R, 107 M

(56) References Cited

U.S. PATENT DOCUMENTS

| | | | |
|---|---|---|---|
| 3,557,407 A | 1/1971 | Lemelson | 18/10 |
| 3,915,272 A * | 10/1975 | Maurice | 192/70.2 |
| 4,569,424 A | 2/1986 | Taylor, Jr. | 188/250 |
| 4,799,579 A | 1/1989 | Myers et al. | 192/107 M |

FOREIGN PATENT DOCUMENTS

| | | |
|---|---|---|
| GB | 2 245 667 A | 1/1992 |
| GB | 2 299 382 A | 10/1996 |
| WO | WO 00/49308 | 8/2000 |

\* cited by examiner

*Primary Examiner*—Paul N. Dickson
*Assistant Examiner*—C. T. Bartz
(74) *Attorney, Agent, or Firm*—Moser, Patterson & Sheridan, L.L.P.

(57) ABSTRACT

The invention is a plate for holding a friction material in a brake assembly. The plate preferably comprises a contact surface for attaching the friction material to the plate, a second surface opposing the contact surface; and a plurality of retaining structures formed on the contact surface, each retaining structure comprising a projecting member extending from a point between the contact surface and the second surface, so that the member extends outwardly from the contact surface for engagement with the friction material.

11 Claims, 16 Drawing Sheets

BRAKE PLATE AND METHOD AND APPARATUS FOR MANUFACTURING SAME

FILE BACKGROUND

The present application is a Continuation-in-Part to an earlier filed U.S. patent application having Ser. No. 09/507,065 filed Feb. 18, 2000, incorporated herein by reference.

TECHNICAL FIELD

This invention relates to brakes, and in particular to an improved brake plate, as well as a method and apparatus for manufacturing the plate.

BACKGROUND ART

The number of motor vehicles has increased greatly in recent years. There is an interest in methods of reducing the cost of manufacturing brakes and replacement parts on the part of both motor vehicle manufacturers and suppliers of parts for brakes. This increased use has also led to a significant increase in the after-market for brake replacement and repair. Brakes are also in increasing demand for motor vehicles such as airplanes, trains, bicycles, all terrain vehicles and motorcycles.

Brakes, as currently manufactured, combine two main parts, namely a plate (often called a backing plate) and a friction pad. The plate is mounted in a brake assembly, and may be formed by making a plate with a variety of bosses, holes, or other features for receiving and retaining the friction pad. The need to use high speed low cost manufacturing methods often results in irregularities in the plate which may lead to difficulties in attaching and/or retaining the friction pad on the plate during braking, when the friction pad is in contact with the rapidly turning brake rotor, or even during the pre-installation handling of the brake pad assembly.

There are a variety of known ways of attaching a friction pad to a plate. One such way is to attach the friction pad to the backing plates using rivets. One disadvantage of the riveting process is that it creates a rigid bond between the plate and the friction pad, which can, as a result of a sudden impact, lead to breaking of the friction pad. Furthermore, this process often requires one or more additional manufacturing steps with a consequent increase in cost. In addition, when the friction pad is worn down over time, the rivets become exposed and rub against the brake rotor, causing scoring on the rotor which is costly to repair.

Another, more recently developed method of mounting the friction pad on the plate is to use a pressurised molding process to mold the friction pad directly onto the plate. In this process, the friction pad may be prepared by blending the components of the friction pad into a pre-form or cake. A conventional pressurized molding system is used to mold the friction pad pre-form onto the plate. A layer of cement or glue if often applied to the contact surface of the plate to improve the adhesion between the plate and the friction pad.

As pressure is applied to the mold assembly, the pre-form becomes heated and begins to flow, filling the mold and covering the appropriate surface of the plate. In this process, the pre-form material is intended to flow into and around the various features to improve the bond between the plate and the friction pad.

The plate is subjected to a number of forces, such as the jarring of the moving vehicle, as well as vibration caused by the rotor and noise. The problem with the prior art processes and plates is that features, such as holes and bosses, stamped into the plate often provided insufficient shear and/or tensile strength in the bond between the friction pad and plate. When additional features are stamped into the plate to increase bond strength, additional manufacturing steps are required, adding to the cost.

The most common prior art features stamped into plates are circular holes. These holes often provide unsatisfactory results because, during the molding process, the pre-form cake does not completely fill all of the holes, which in turn, leads to deficient bonding between the plate and the pre-form. The incomplete hole fills can are clearly visible, and often raise quality concerns when inspected by buyers. The incomplete hole fills also have an aesthetically displeasing appearance, which can also make them less attractive to customers. Accordingly, it has become common practice in prior art plates to fill the incomplete hole fills with putty and to paint over them, to both hide the unsatisfactory molding results and to improve appearance. These additional manufacturing steps have the added disadvantage of increasing the cost of manufacturing the disc brake.

Furthermore, the holes stamped by prior art processes reduce structural strength of the plate, and make it more vulnerable to the various forces acting on it. These forces may distort the shape of the plate, leading to uneven wear on the friction pad, or can lead to structural failure of the plate.

Another problem with brake plates is caused by the heat generated by friction. The expansion and contraction values of the plate are different from those of the friction material. Braking generates heat so the plate and material are exposed to frequent heating and cooling. Since the expansion and contraction values differ, there may be a separation between the plate and the material, particularly where the plate is flat or has large flat areas. Rust can then form between the plate, which leads to noise and brake failure.

Accordingly, there is a need for a brake plate and a method of manufacturing same which can provide improved bonding with the friction pad without increasing the cost of producing the plate

SUMMARY OF THE INVENTION

It is an object of the invention to provide a plate which provides an improved bond between it and the friction pad, as well as increasing the structural strength of the plate, without increasing the cost of producing the plate. In addition, it is an object of the invention to provide a method and apparatus for manufacturing the plate which reduces time and cost by requiring fewer manufacturing steps, while at the same time retaining the structural strength of the backing plate.

Further features of the invention will be described or will become apparent in the course of the following detailed description.

The invention includes a plate for holding a friction material in a brake assembly, the plate comprising:

- contact surface for attaching the friction material to the plate,
- a second surface opposing the contact surface;
- a plurality of retaining structures formed on the contact surface, each retaining structure comprising a projecting member extending from a point between the contact surface and the second surface, so that the member extends outwardly from the contact surface for engagement with the friction material. The retaining structure may further comprise a depression surface abutting the projecting member, the depression surface extending into the contact surface. The contact surface may be curved or substantially flat. The brake may comprise a disk brake or a drum brake. The plate may comprise integral retaining structures.

The retaining structures can be formed from the plate, and preferably cut or scored. In a variation, the projecting member may be a burr. The burr optionally comprises a hook shape, wherein a distal end of the hook points away from the depression adjacent to the hook. The retaining structures are optionally disposed in a plurality of rows. The rows are optionally substantially parallel. The rows may be usefully disposed longitudinally.

Preferably, the contact surface and the second surface of the plate define a perpendicular axis. The projecting member extends outwardly from the contact surface so that the projecting member is offset from the axis. The projecting member comprises a first end and a second end. The first end is connected to the plate. In a preferred embodiment, the second end is rotated with respect to the first end. The second end may also be offset from the first end so that the projecting member is bent in a hook shape.

Where the projecting member comprises a burr, the burr is preferably "twisted" in that the second end is rotated with respect to the first end. Any degree of rotation is suitable within the tolerance of the cutting or scoring process.

The burr is also preferably "bent" in that the second end is offset from the first end. Any direction is suitable within the tolerance of the cutting or scoring process.

In a further embodiment of the plate, the twisted and bent burrs are disposed in rows. The rows may comprise burrs twisted and bent alternately in counterclockwise and clockwise directions. Alternatively, the rows may comprise burrs twisted and bent in alternating rows of counterclockwise- and clockwise-directed burrs.

The invention also includes a method of manufacturing a brake plate for securing a friction material to a contact surface thereof, the method comprising providing:
   a contact surface for attaching the friction pad to the plate,
   a second surface opposing the contact surface;
   a plurality of retaining structures formed on the contact surface, each retaining structure comprising a projecting member extending from a point between the contact surface and the second surface, so that the member extends outwardly from the contact surface for engagement with the friction pad.

The invention includes a brake plate, preferably a drum brake plate or a disc brake plate made according to a method of the invention or with the apparatus of the invention.

In one method, the retaining structures are formed by cutting the contact surface. The retaining structures are alternatively formed by scoring the contact surface. In another variation, the retaining structures are formed by cutting a plurality of rows of retaining structures on the contact surface. The rows are optionally substantially parallel and/or disposed longitudinally.

In one embodiment, the cutting is done by a plurality of knives, each knife having a cutting edge, the edge having a plurality of teeth connected thereto. Each retaining structure is preferably made by one tooth. Each tooth preferably cuts a projecting member from the contact surface to form an adjacent depression. The knives are preferably disposed longitudinally in relation to the plate. The knives may be substantially parallel. Adjacent knives preferably move in opposing directions. The plurality of knives are preferably moving parallel to the contact surface prior to impacting the plate. The plurality of knives preferably commence to move parallel to the contact surface upon impact with the plate.

The plate may be stationary while it is punched by the knives. The knives are optionally fixed in the direction perpendicular to the contact surface and the plate is impacted onto the knives.

Another variation of the invention relates to an apparatus for manufacturing a brake plate having a plurality of retaining structures formed on a contact surface thereof for retaining a friction material, comprising:
   a means for cutting a plurality of retaining structures on the contact surface, each retaining structure comprising a projecting member extending from a point between the contact surface and the second surface, so that the member extends outwardly from the contact surface for engagement with the friction pad, the cutting means being adapted to move generally parallel to the contact surface to cut the retaining structures;
   a driving means for impacting the cutting means and the contact surface of the plate to form the retaining structures.

The cutting means preferably comprises a plurality of knives, each knife having a cutting edge, the edge having a plurality of teeth connected thereto, each tooth adapted to form one of the plurality of retaining structures upon impact with the contact surface.

The apparatus optionally further comprises:
   at least one drive member slidably connected to at least one side of each of the plurality of knives;
   at least one slide member slidably connected to the drive member;

During impact between the knives and the contact surface, the slide member is preferably adapted to move away from the contact surface, the slide member being adapted to move the drive member generally parallel to the contact surface, the drive member being adapted to move the knives generally parallel to the contact surface.

The slide member may have an inclined sliding surface, the sliding surface being adapted to move the drive member generally parallel to the contact surface upon movement of the slide member. The at least one slide member can be two slide members, the at least one drive member can comprise first and second drive members, and the at least one side of the each of the knives can comprise a first side and a second side, wherein first drive member is proximate to the first side of at least one knife, and the second drive member is proximate the second side of the remaining knives. The first and second sides of alternate knives are preferably proximate to the first and second drive members, respectively. The adjacent knives preferably move in opposing directions upon impact with the contact surface. The apparatus may further comprise a return means for returning the knives to a starting position. The return means is optionally at least one spring attached to a first and second slide rod, the slide rods being located within a first and second guide slots defined proximate to the first and second side of each knife. The plurality of knives are preferably disposed longitudinally in relation to the plate. The apparatus knives are preferably substantially parallel to each other.

The slide member and the plurality of knives are preferably adapted to move generally parallel to the contact surface prior to impact with the plate. The plurality of knives are preferably adapted to move parallel to the contact surface upon impact with the plate. The plate is optionally stationary while punched by the knives. The knives are optionally fixed in the direction perpendicular to the contact surface, and the plate is driven onto the knives. The impacting means optionally comprises a press having a top movable portion and a bottom stationary portion.

The apparatus of optionally further comprises:

a base plate secured to the top portion of the press;

two side plates secured to the base plate, the side plates projecting downwardly therefrom;

a positioning means for maintaining the knives in proximate to each other; the positioning means being connected to the side plates;

a force adjustment means for adjusting the force of impact of the knives against the contact surface, the force adjustment means having a pressure plate generally parallel to the base plate and at least one spring disposed between the base plate and the pressure plate, the pressure plate being connected to the knives;

wherein the first and second slide rods are suspended from the base plate.

The first and second sliding members preferably impact the bottom portion of the press prior to the knives impacting the contact surface, thereby causing the knives to move generally parallel to the contact surface prior to impact of the knives against the contact surface. The first and second sliding members preferably impact the bottom portion of the press substantially simultaneously with the knives impacting the contact surface, thereby causing the knives to move generally parallel to the contact surface substantially simultaneously with impact of the knives against the contact surface.

BRIEF DESCRIPTION OF THE DRAWINGS

In order that the invention may be more clearly understood, preferred embodiments thereof will now be described in detail by way of example, with reference to the accompanying drawings, in which.

DETAILED DESCRIPTION OF THE INVENTION

The invention is a plate for holding a friction material in a brake assembly. The plate preferably comprises:

(a) a contact surface for attaching the friction material to the plate, (b) a second surface opposing the contact surface;

(c) a plurality of retaining structures formed on the contact surface, each retaining structure comprising a projecting member extending from a point between the contact surface and the second surface, so that the member extends outwardly from the contact surface for engagement with the friction material.

The retaining structure may further comprise a depression surface abutting the projecting member, the depression surface extending into the contact surface.

The brake plate, as well as the process and apparatus for manufacturing same according to the present invention are useful in the field of manufacturing of vehicle brake parts. The plate is useful in brakes for any motor vehicle, such as cars, trucks, airplanes, trains, bicycles, all terrain vehicles or motorcycles.

Figure 1:
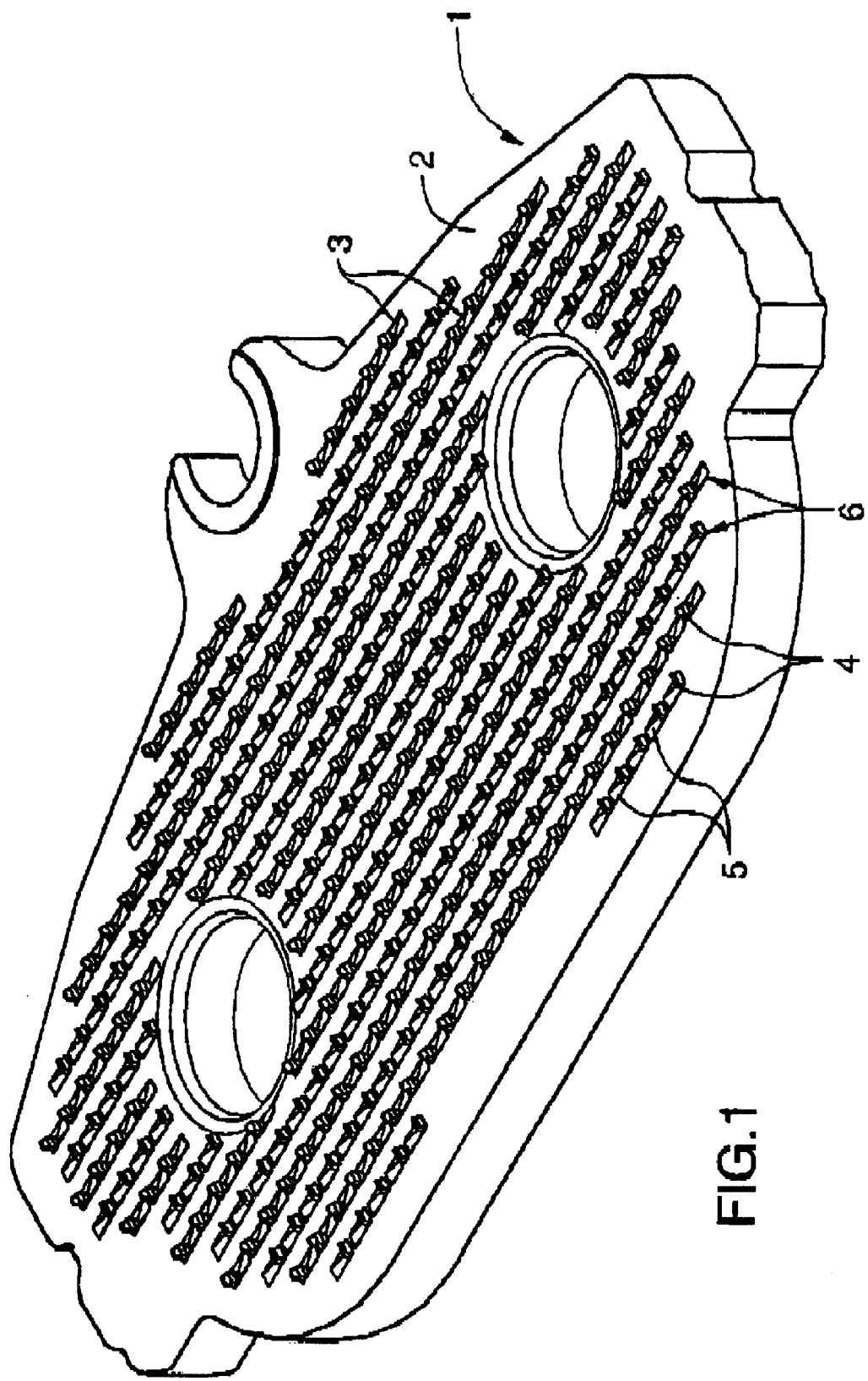
FIG. 1 is a perspective view of a preferred embodiment of a plate according to the present invention.
Figure 1A:
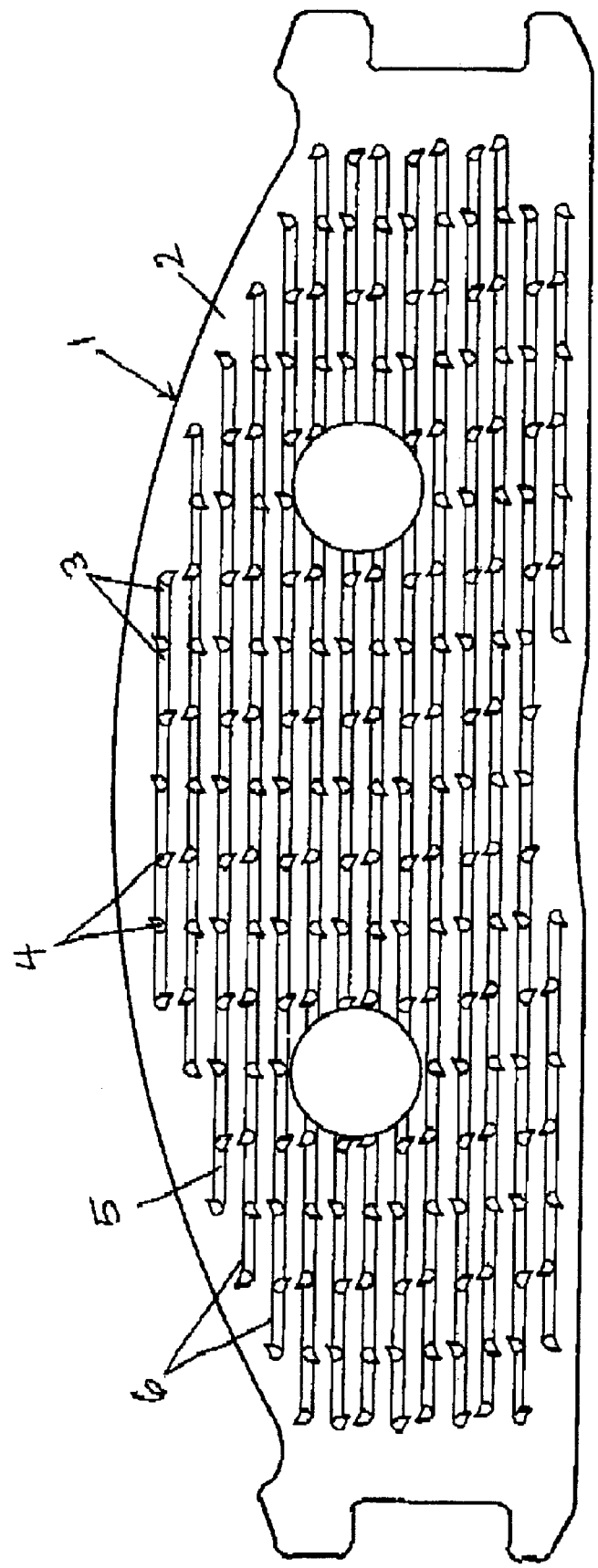
FIG. 1A is a top plan view of the plate.
Figure 1B:
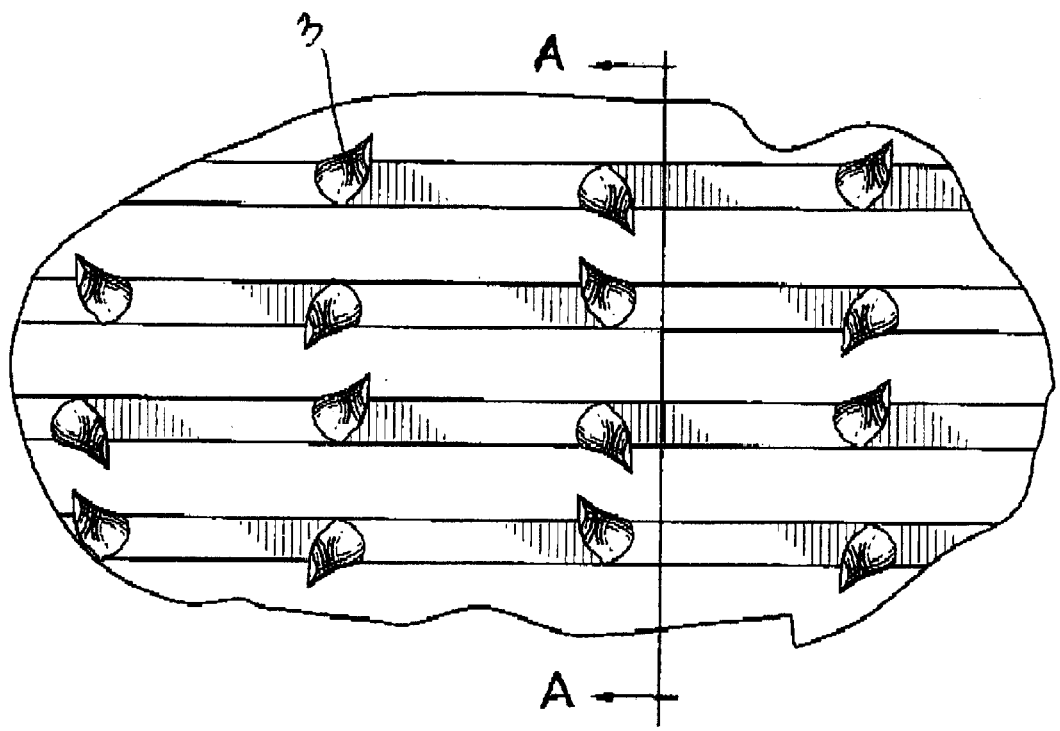
FIG. 1B is a magnified view showing the rotation and direction of the burrs on the plate.

FIG. 1 shows a brake plate 1 according to a preferred embodiment of the present invention. The plate 1 has a conventional shape and any suitable thickness (⅛–½ of an inch), and is preferably manufactured from metal or a metal composite adapted to withstand the rigors of a conventional braking system. The circular holes shown on the plate are not necessary and are included for illustrative purposes only. The backing plate has a contact surface 2 for molding a friction material (not shown) thereto by a conventional molding process.

Any suitable number of retaining structures 3 are connected to the first surface of the backing plate. Preferably, the retaining structures are integrally formed by punching the backing plate, as described in more detail below. Each retaining structure includes a burr 4 projecting out of the first surface, which is located adjacent to a corresponding depression 5 defined in the contact surface 2. Preferably, each burr is integrally formed by cutting the burr out of the first surface of the backing plate, which creates the corresponding depression 5. The projecting member extends from a point between the contact surface and the second surface 36 (in FIG. 6, the second surface is opposite the contact surface and appears as the flat bottom surface of the plate), so that the member extends outwardly from the contact surface for engagement with the friction material. Each burr preferably has a curved shape, which curves away from its corresponding depression.

Figure 6:
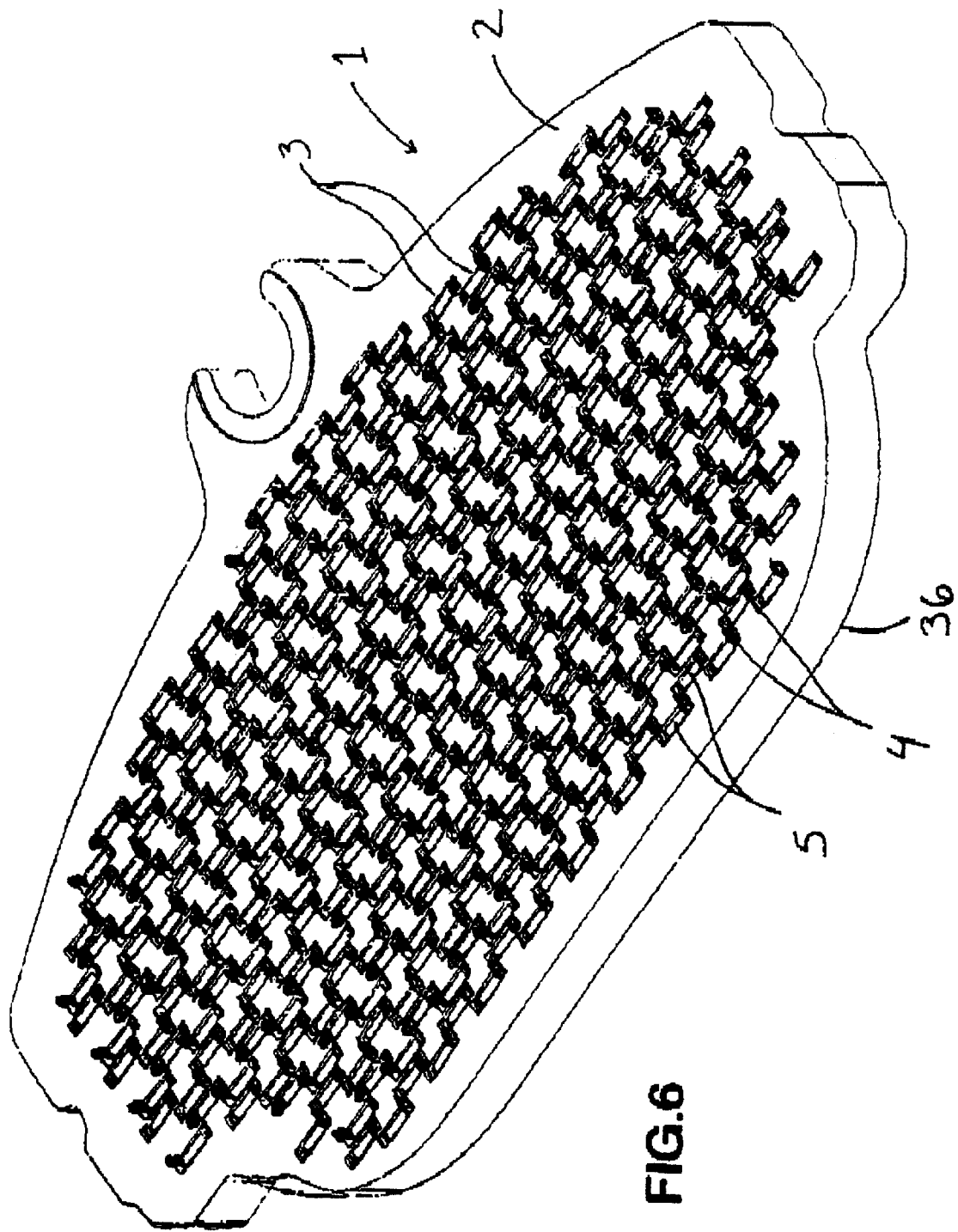
FIG. 6 is a perspective view of an alternate preferred embodiment of a plate according to the present invention.

The retaining structures 3 are preferably arranged in longitudinally disposed substantially parallel rows 6. Preferably, the position of the burr 4 and depression 5 is identical for each row, but alternates with adjacent rows, as shown in FIG. 1. Preferably, the number of rows is sufficient to cover substantially the entire surface area of the backing plate 1 in order to provide maximum bond strength. The depth of the depressions and the height of the burrs depends on the bond strength required for a particular application. FIG. 6 shows a variation of the plate in which there is increased space between the structures of each row. The retaining structures in each row are spaced apart farther than those in FIG. 1.

The plate 1 according to the present invention does not need to be coated with an any adhesive to achieve the required bond strength with the friction material. Since the plate has a large number of projecting members, there will be no separation between the plate and the material as the plate and material are subjected to frequent heating and cooling. The plate lasts longer and is safer.

For a disc brake as shown in FIG. 1, the height of the members may preferably be about 0.030 inches to 0.075 inches above the contact surface. There are preferably at least about 20 projecting members per square inch. The horizontal pitch (distance between each member) between members in the direction of chip formation may preferably range between 0.120 and 0.250 inches. The pitch between rows is preferably about 0.100 to 0.200 inches. The coverage of members on the contact surface is preferably at least about 65% for a disc brake.

For a disc brake as shown in FIG. 6, the height of the members may preferably be about 0.030 inches to 0.075 inches and more preferably about 0.045 to 0.060 inches above the contact surface. There are preferably at least about 30 projecting members per square inch. The horizontal pitch (distance between each) between members in the direction of chip formation may preferably range between 0.120 and 0.250 inches and is more preferably 0.060 inches. The coverage of members on the contact surface is preferably at least about 65% for a disc brake.

In a preferred embodiment, the burrs 4 are twisted and bent, which is best shown in FIGS. 1A–1C and 6A–6C. Each burr 4 is preferably "twisted" in that it is offset from the perpendicular axis defined by the contact surface 2 and the second surface 36 by rotation about the axis.

Figure 1C:
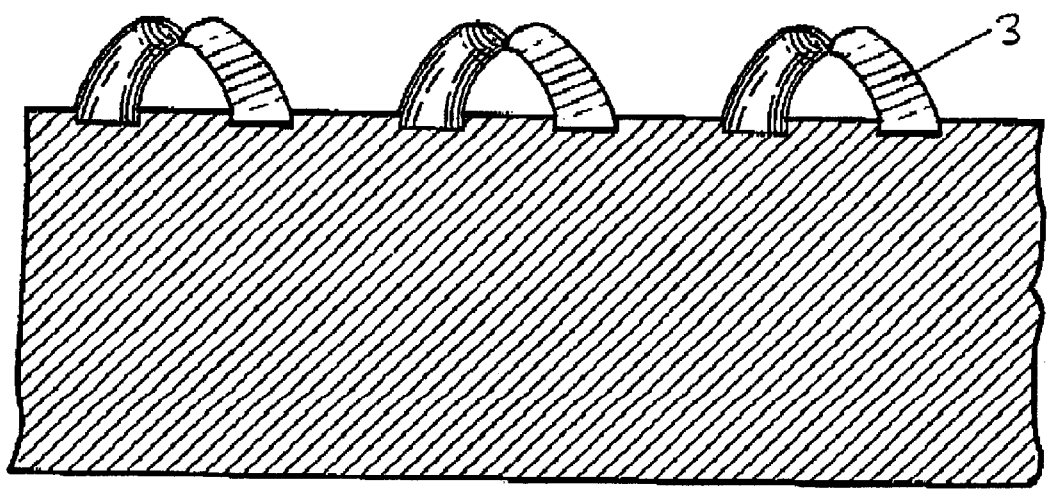
FIG. 1C is a cross-sectional view showing the burrs shown in FIG. 1B.

Preferably, the burrs 4 are also "bent" in that they point in a direction away from the perpendicular axis and preferably away from the associated depression surfaces 5. Cross-sectional FIGS. 1C and 6C show the direction of the "bend" of the burrs according to two embodiments of the plate.

Figure 6A:
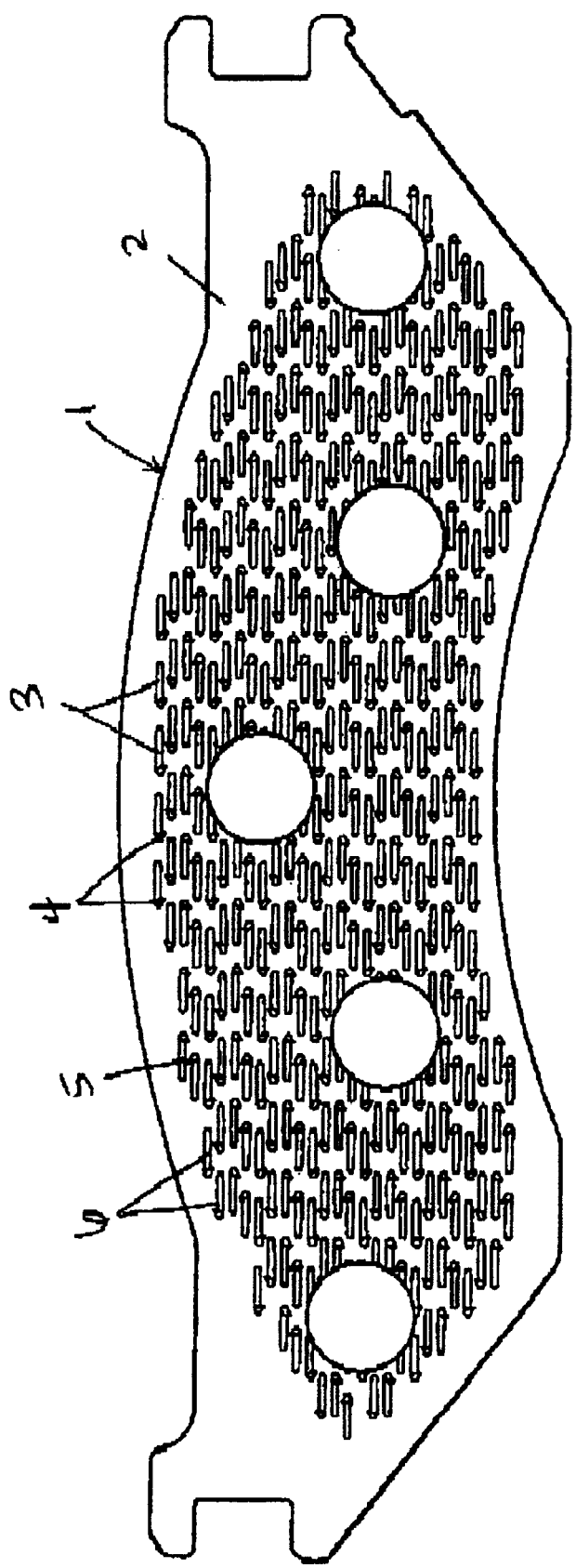
FIG. 6A is a top plan view of the plate.
Figure 6B:
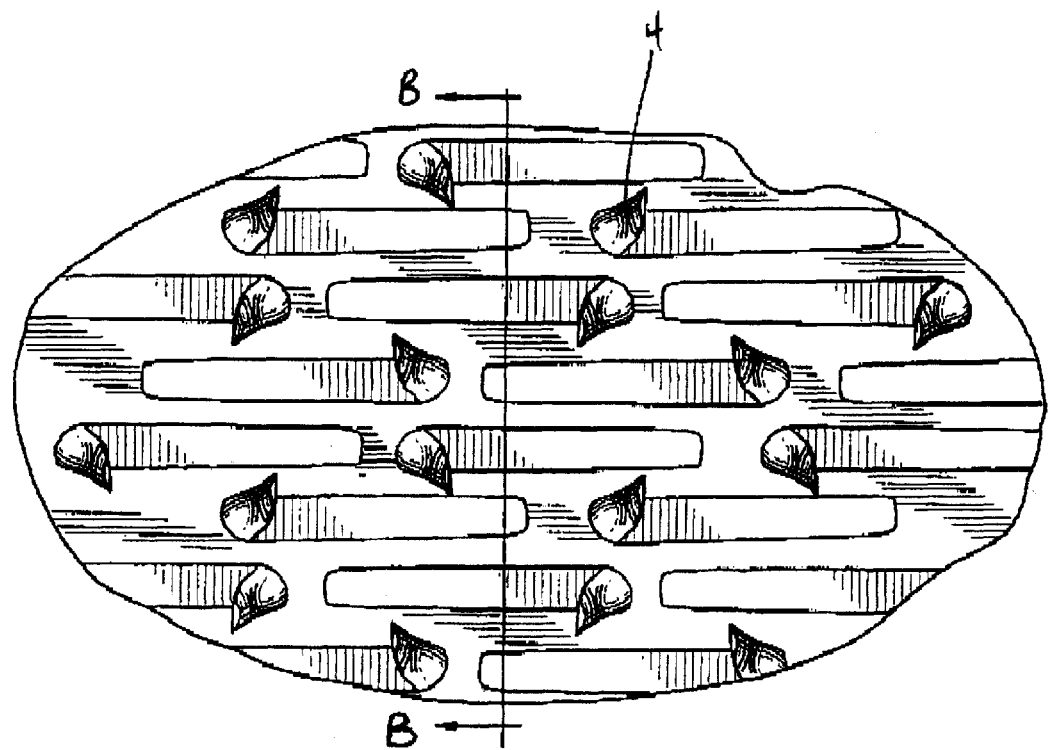
FIG. 6B is a magnified view showing the rotation and direction of the burrs on the plate.
Figure 6C:
FIG. 6C is a cross-sectional view showing the burrs shown in FIG. 6B.

The burrs 4 may be disposed in a pattern alternating between counterclockwise- and clockwise-directed twisted and bent burrs 4 (according to the pattern shown in FIGS. 1A–1B), or the pattern may alternate by rows of counterclockwise- and clockwise-directed twisted and bent retaining structures 4 (according to the pattern shown in FIGS. 6A–6B).

Figure 2:
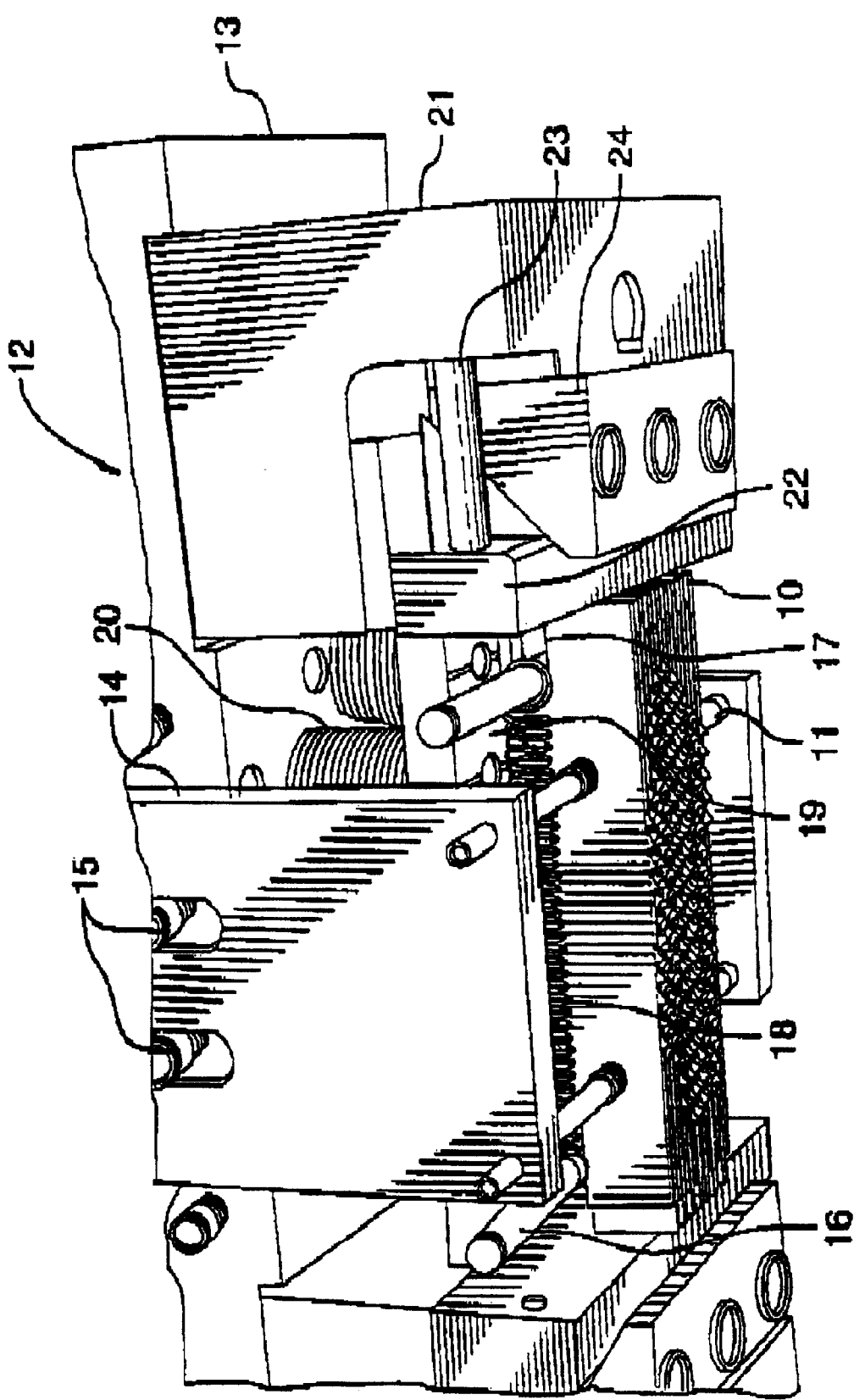
FIG. 2 is a perspective view of a preferred embodiment of an apparatus for manufacturing the plate according to the present invention.

The method of manufacturing the backing plate 1 according to the present invention comprises placing the backing plate on a flat surface under a conventional press and punching the contact surface 2 of the backing plate with a series of substantially parallel knives 10. Referring to FIG. 2, the knives are preferably disposed substantially parallel to the longitudinal axis of the backing plate. Each knife has a plurality of preferably identical teeth 11 defined along a cutting edge thereof. Each tooth forms the depression 5 and burr 4 of one retaining structure 3. The configuration of the teeth may alternate from row to row, such that every other row has an identical configuration. In FIG. 6, a knife with offset teeth is preferably used to create a checkerboard pattern (alternating retaining structure pattern) between rows cut by the same knife. Preferably, the knife enters the contact surface at a 5–25° angle pushing the burrs 4 into a twisted and bent formation (formation shown in FIGS. 1A–1B and 6A–6B). The direction of the twist and the bend is preferably alternating, either by individual retaining structure 3 (pattern shown in FIGS. 1A–1B) or by row 6 (pattern shown in FIGS. 6A–6B).

FIG. 2 shows the apparatus 12 for manufacturing the backing plate. according to the present invention. The apparatus is mounted to a conventional press in any suitable manner for punching the backing plate 1, as described above.

Figure 3A:
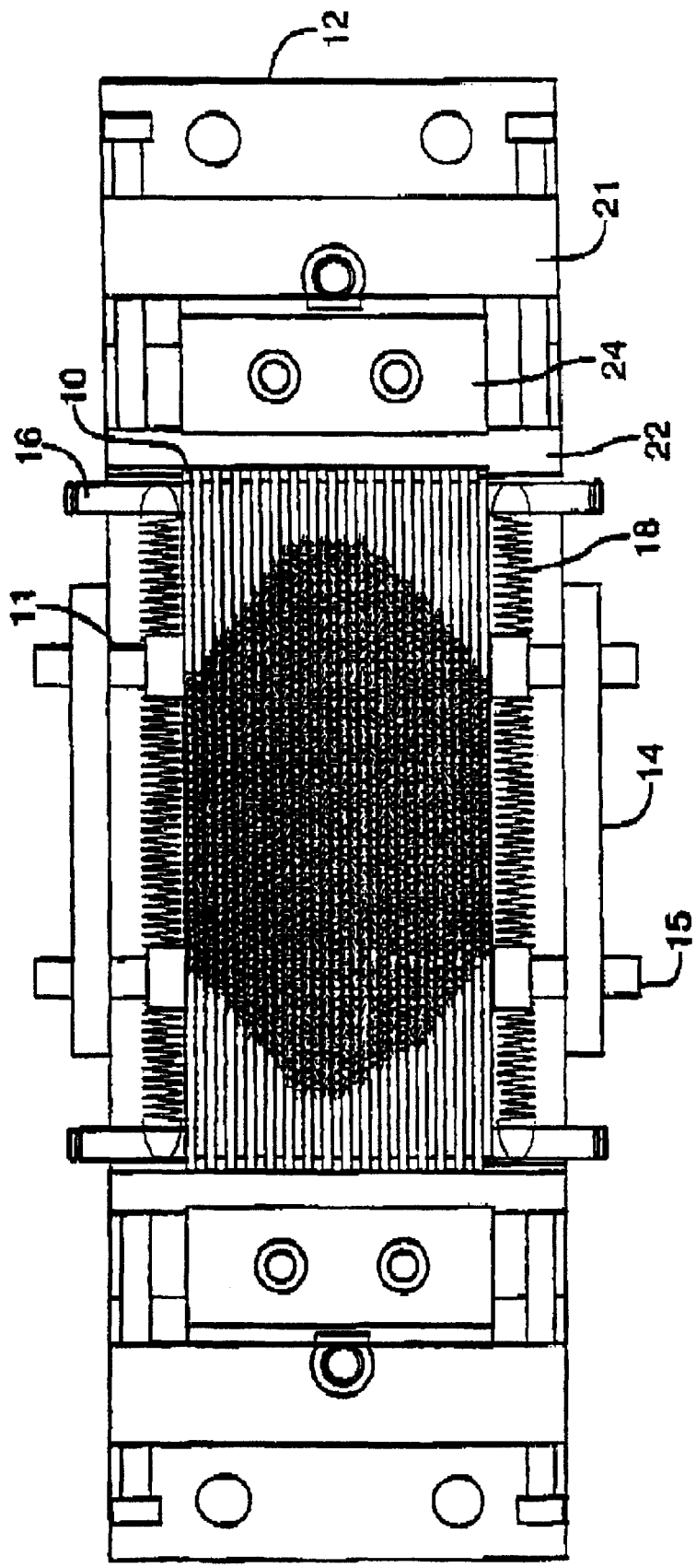
FIG. 3A is a plan view of the apparatus.
Figure 3B:
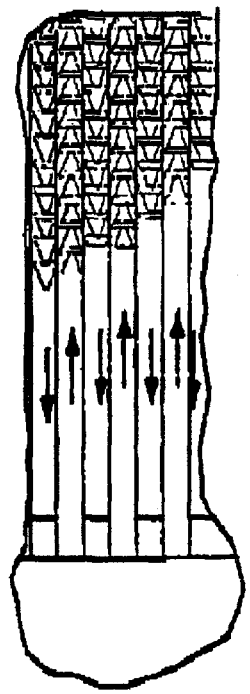
FIG. 3B is a magnified view showing the knives and teeth of the apparatus shown in FIG. 3A.
Figure 4:
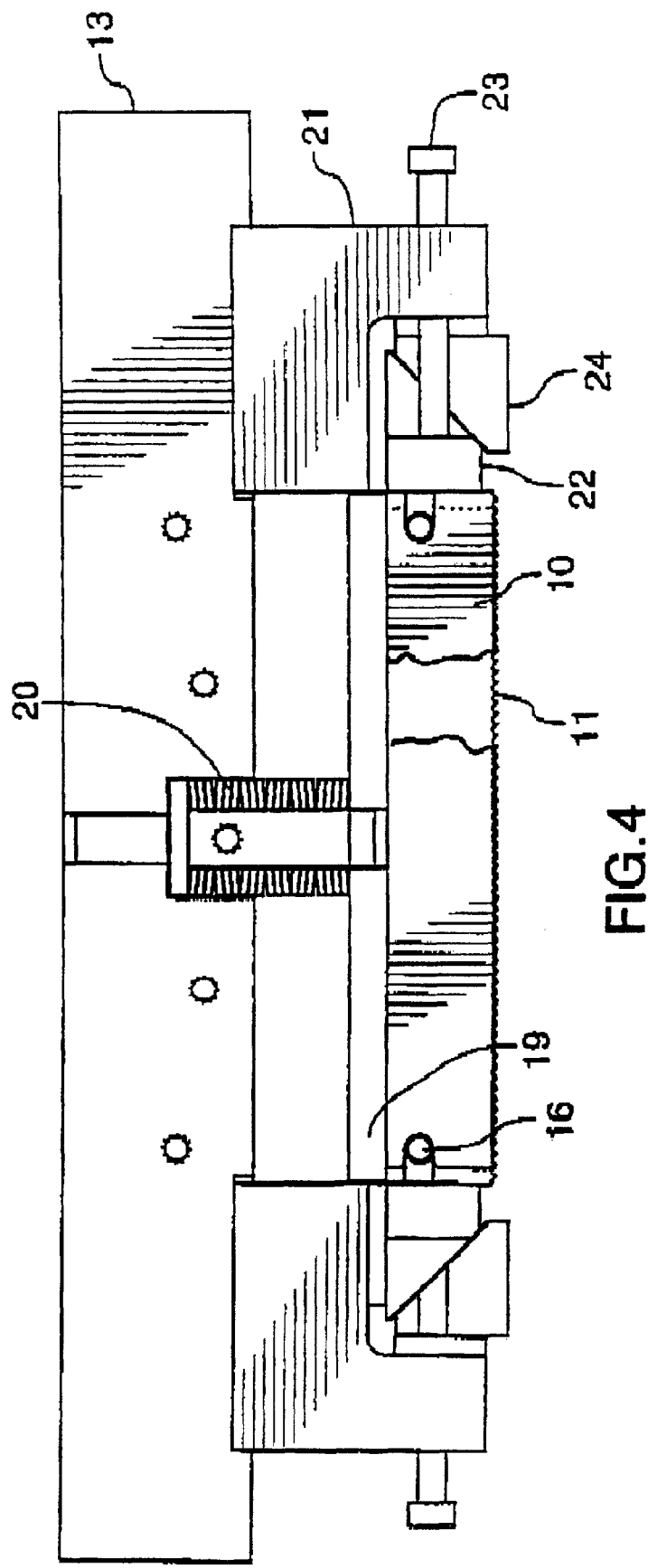
FIG. 4 is an elevation view of the apparatus with the side plates removed.

Referring to FIGS. 2–4, the apparatus 12 includes a base plate 13 from which two side plates 14 are suspended by preferably four conventional screws 15. Preferably, two transverse slide rods 16 are suspended from four support springs (not shown) which are each attached to one of the screws at one end and to an end of the slide rod at the other end. The slide rods are slidably secured to the knives 10 by preferably locating in guide slots 17 defined in the knives. A biasing means, such as, for example, two return springs 18 are connected to each slide rod to bias the slide rods toward each other. A pressure plate 19 is disposed above the non-cutting edges of the knives. Preferably, a plurality of adjustment springs 20 are disposed between the base plate and the pressure plate to urge the two apart. Two block housings 21 are mounted transversely onto the base plate adjacent to the edges of the knives. A drive block 22 is mounted on each block housing by a slide bolt 23 which is disposed substantially parallel to the longitudinal axis of the knives. A slide block 24 is slidably mounted in each housing adjacent to the drive block.

Figure 5A:
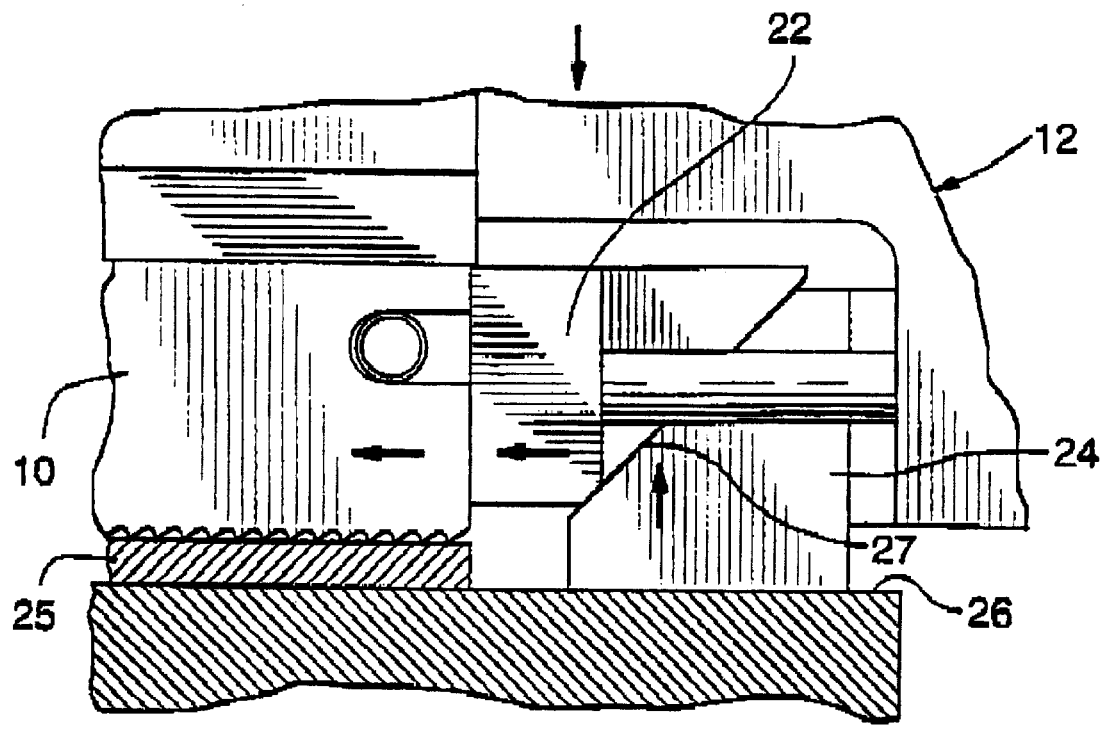
FIG. 5A is a cross-sectional view showing the apparatus impacting the bottom of a conventional press.

FIG. 5A shows the initial step of operation of the apparatus 12. A conventional press (not shown) drives the apparatus 12 onto a plate blank 25, such that the slide block 24 preferably. impacts the bottom surface of the press 26 before the knives 10 impact the blank. The impact against the bottom surface of the plate drives the slide block up relative to the drive block 22, causing the slide block sliding surface 27 to exert a force on the drive block substantially parallel to the longitudinal axis of the knives. This force causes each drive block to move alternate knives along their longitudinal axis. Because only alternate knives contact each drive block before impact, adjacent knives are pushed in opposite directions by each drive block. Preferably, the knives are moving before the blank contacts the knives.

The teeth of the knives may be arranged along the longitudinal axis of the knife, so that they form a single row. There may be portions where no teeth are present, as in FIG. 8D. Each tooth has a leading surface which is transverse to the axis of the knife. The leading surface may be angled to determine the burr shape, in the same manner as a plow is angled. All the teeth may have a similar leading angle or they may be varied.

In a knife variation, the teeth are offset, preferably so that the teeth are arranged in two or more rows, as shown in FIG. 9. Each knife thus cuts rows of teeth along two longitudinal axes (forming two rows that are preferably substantially parallel) to provide a brake pad as shown in FIG. 6.

Figure 5B:
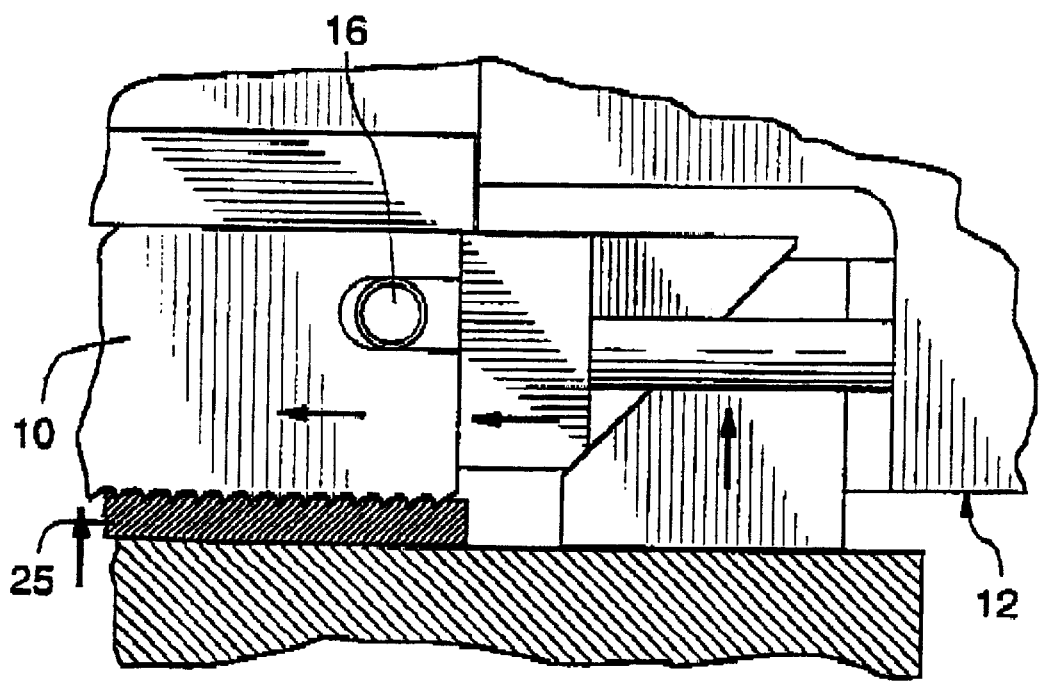
FIG. 5B is a cross-sectional view showing the knives beginning to cut into a blank.
Figure 5C:
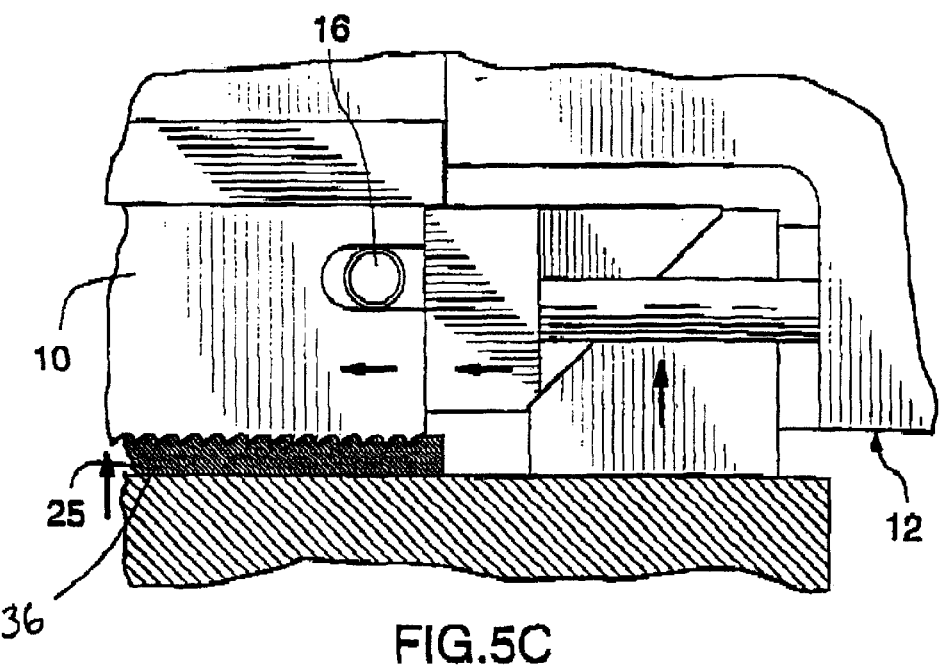
FIG. 5C is a cross-sectional view showing the knives completing the cut into a blank.
Figure 5D:
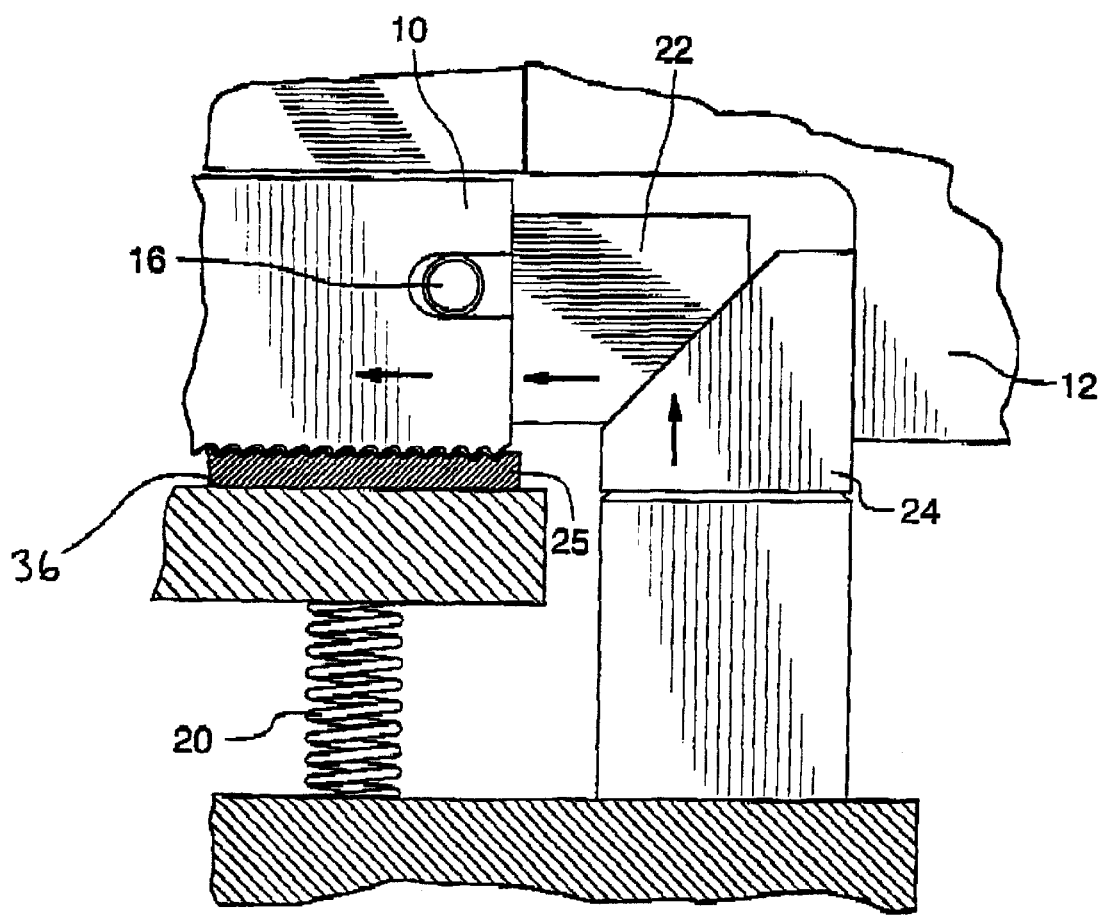
FIG. 5D is a cross sectional view showing the apparatus impacting a press. The spring is beneath the press. A spring or a nitro spring may be used.

Referring to FIGS. 5B and 5C, the impact of the knives 10 against the blank 25 may be regulated by the biasing means, preferably adjustment springs 20 (shown in FIG. 2). The adjustment springs allow the apparatus 12 to be mounted on presses having different force specifications. The adjustment springs effectively ensure that a constant force is exerted against the knives, regardless of the force applied by the press. In a variation, the springs are located beneath the plate as shown in FIG. 5D. As the knives are pushed down into the blank, they also slide along the slide rods 16 parallel to their longitudinal axis, such that adjacent knives are moving in opposite directions as they cut. These simultaneous downward and sliding movements cause each tooth 11 of a knife to form one retaining structure 3.

The apparatus is able to complete an entire plate in one punch. After the press lifts the apparatus 12, the slide block 24 is returned into its starting position by gravity, and the knives 10 and drive block 22 are returned to their starting positions by the slide springs 19. One skilled in the art could readily use the knives to prepare drum brake plates.

During the process of molding and securing the friction material to the plate, the pre-form material is set into a mold and pressed against the plate. The material flows into and surrounds each retaining structure 3 to bond with the plate 1. The retaining structures provide improved tensile strength, as well as providing improved shear resistance. The tensile and shear strengths can be varied by changing either the depth of the cut (i.e. the depression 5), which also increases the height of the burr 4. These results are accomplished using a two step process, and without the need for additional features, such as holes, leading to a decreased manufacturing time and significant cost savings.

Figure 7:
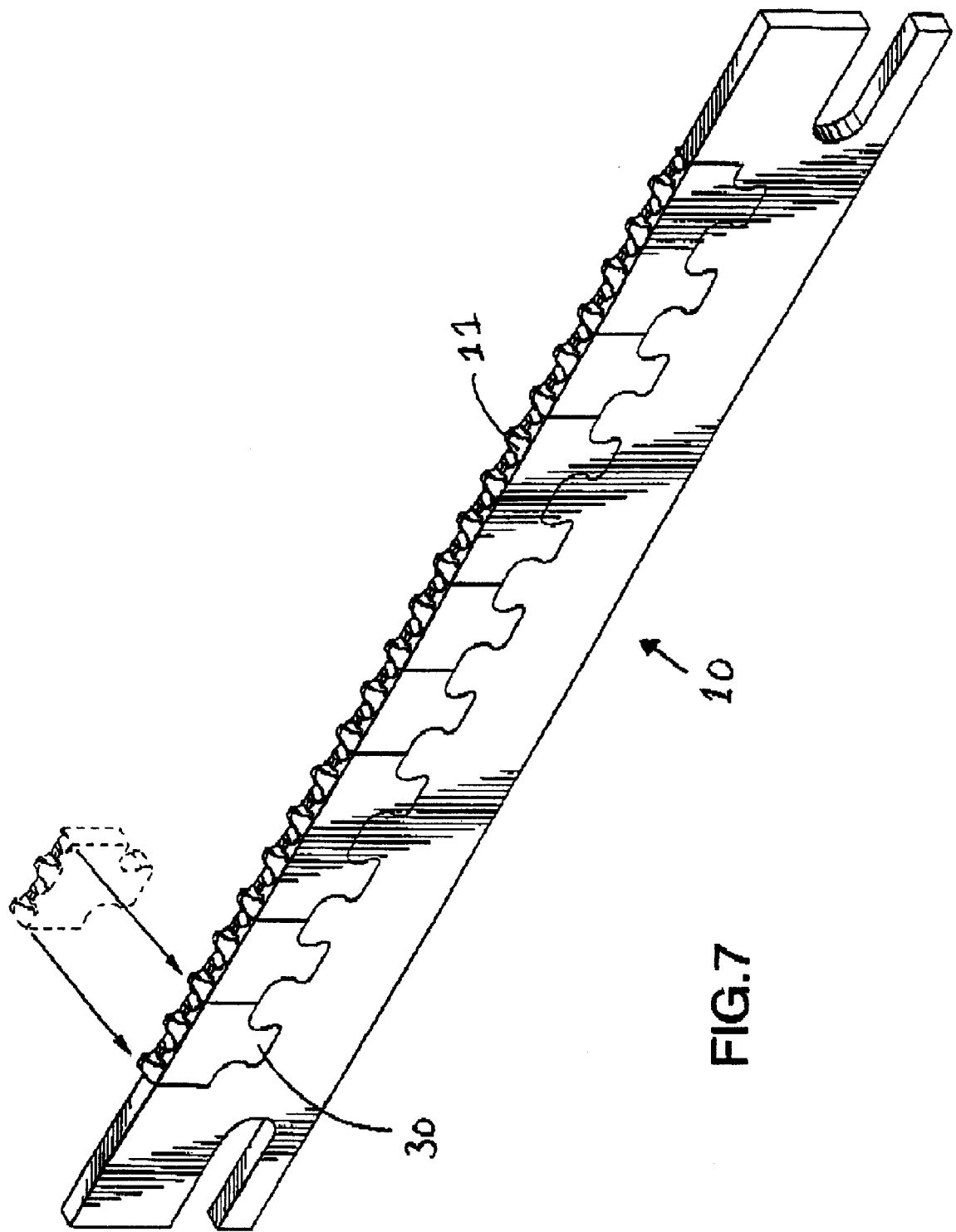
FIG. 7 is a perspective view of a preferred embodiment of a knife with rows of offset teeth for manufacturing the backing plate according to the present invention. The figure shows an insert allowing one or more teeth to be releasably inserted into the knife.

FIG. 5D shows a variation of the apparatus in which a spring is mounted on a fixed press bed so that the spring is beneath the press. The spring may be a conventional coil spring or a nitrogen spring. Any other suitable biasing means may be used. A knife of the invention is shown in FIGS. 7 and 8. In these figures, the teeth of each knife are aligned along an axis defined by the knife. However, the teeth may be offset to provide a brake pad of the type shown in FIG. 6. FIG. 7 shows a knife with offset teeth.

Figure 8A:
FIG. 8A is a top plan view of a knife.
Figure 8B:
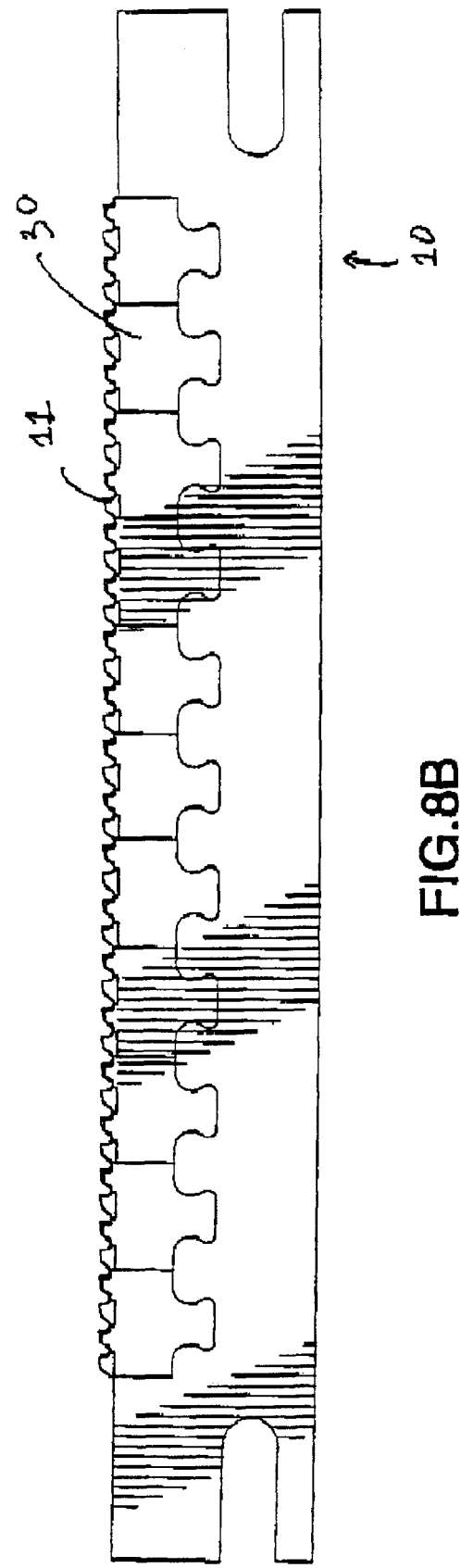
FIG. 8B is a side plan view of a knife.
Figure 8C:
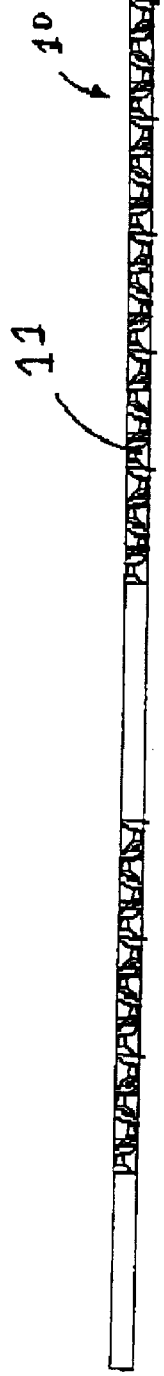
FIG. 8C is a top plan view of a knife.
Figure 8D:
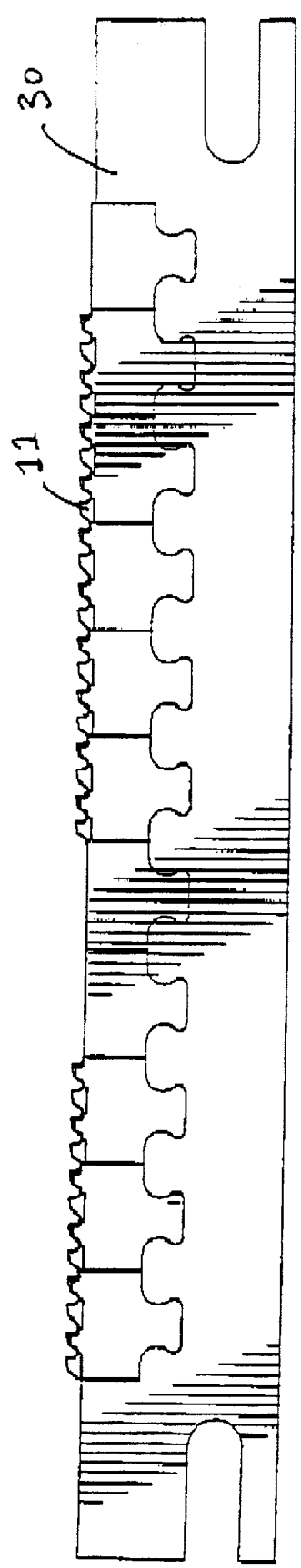
FIG. 8D is a side plan view of a knife.
Figure 9A:
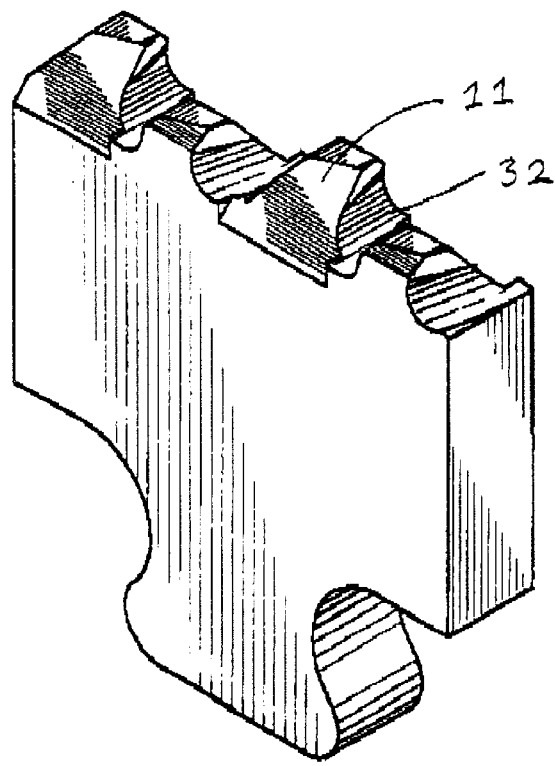
FIGS. 9A and B are perspective views of a releasable knife insert having offset teeth.
Figure 9B:
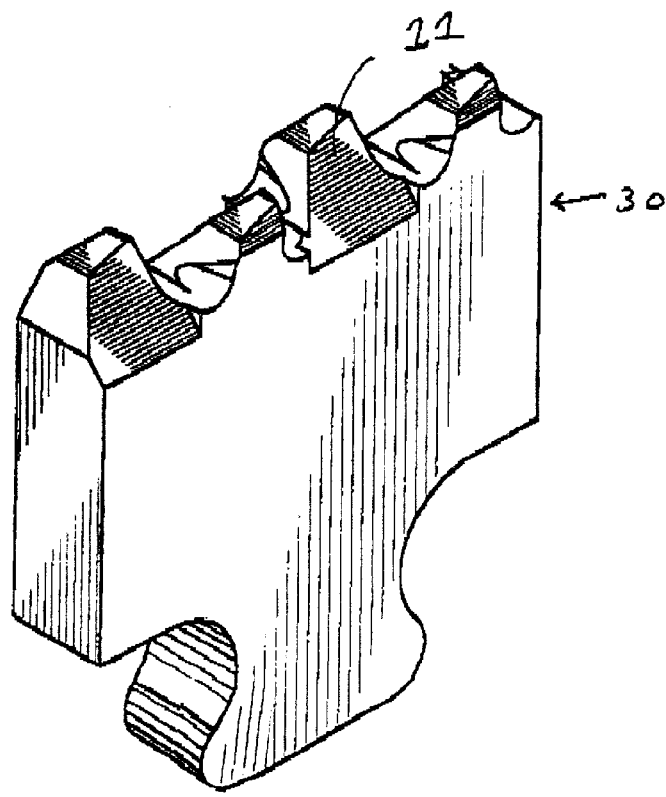
FIG. 9C is a perspective view of a releasable knife insert.
Figure 9C:
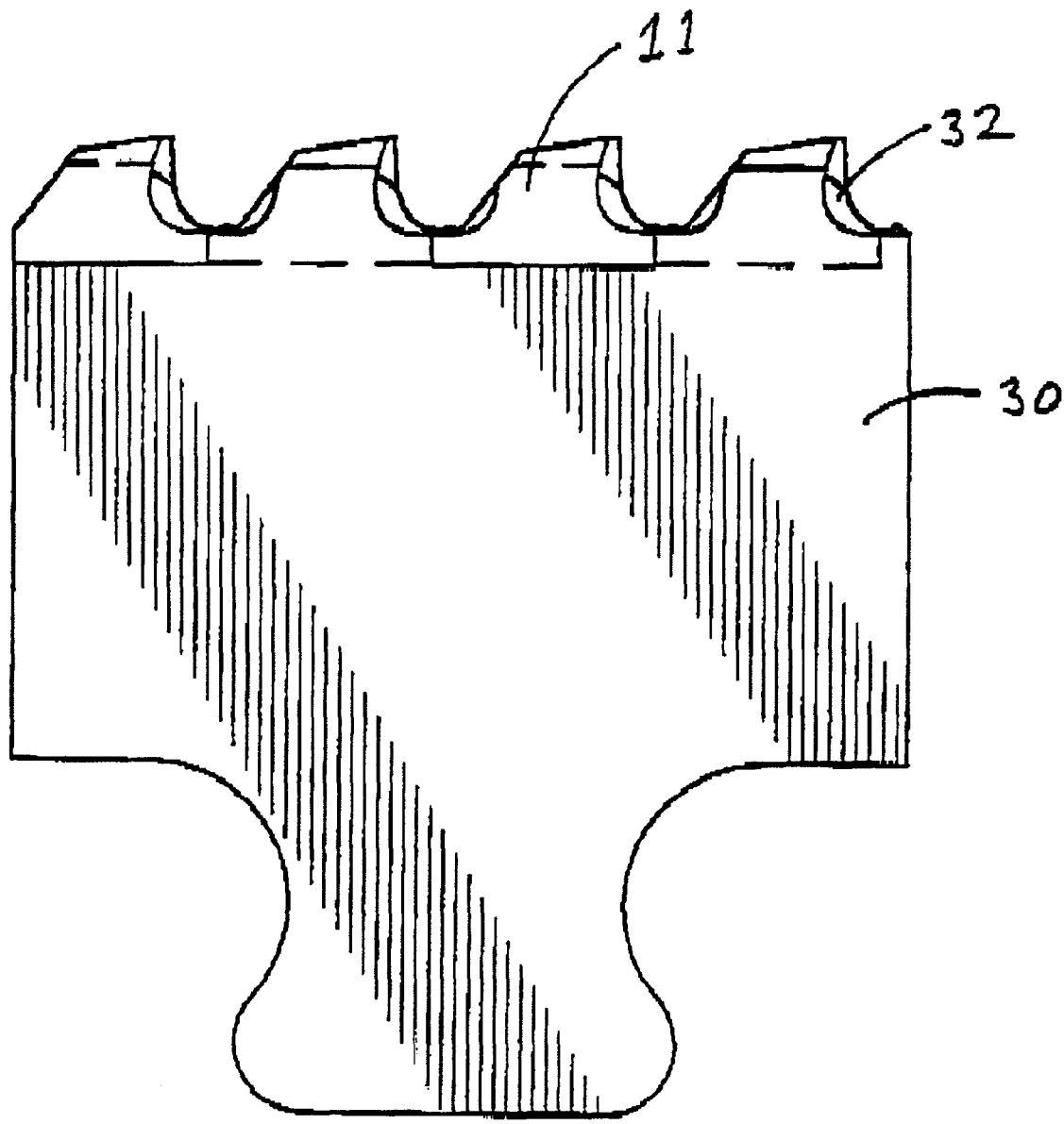

FIG. 7 also shows that the knife may be made with releasable inserts. Broken or dull teeth may be readily changed without discarding the knife. A blank insert with no teeth may also be used. Inserts may optionally be permanently fixed in the knife. FIGS. 8A and 8B show the knife with continuous teeth. FIGS. 8C and 8D show the knife having a blank surface where no teeth are present. The plate will have no retaining surfaces formed where the knife is blank. FIGS. 9A and 9B show offset teeth. FIG. 9C shows that the offset teeth are preferably about the same height above the knife.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed is:

1. A plate for holding a friction material in a brake assembly, the plate comprising:

a contact surface for attaching the friction material to the plate, a second surface opposing the contact surface; and a plurality of parallel rows of integral retaining structures formed on the contact surface, each retaining structure comprising a projecting member extending outwardly from the contact surface for engagement with the friction material, the projecting member comprising a first end and a second end, the first end connected to the plate, the contact surface and the second surface defining a perpendicular axis therebetween at the first end of the projecting member, the second end of the projecting member being offset from the axis and being rotated with respect to the first end.

2. The plate of claim 1, wherein the second end is offset from the first end so that the projecting member is bent in a hook shape.

3. The plate of claim 1, wherein each retaining structure further comprises a depression surface abutting the projecting member, the depression surface extending into the contact surface.

4. The plate of claim 1, wherein the contact surface is curved or substantially flat.

5. The plate of claim 1, wherein the brake comprises a disk brake or a drum brake.

6. The plate of claim 3, wherein the projecting member comprises a burr.

7. The plate of claim 6, wherein the burr is twisted and bent.

8. The plate of claim 7, wherein a distal end of the burr points away from the depression surface adjacent to the burr.

9. The plate of claim 6, wherein the rows are disposed longitudinally.

10. The plate of claim 9, wherein each row comprises burrs twisted and bent alternately in counterclockwise and clockwise directions.

11. The plate of claim 9, wherein the rows comprise burrs twisted and bent alternately in rows of counterclockwise and clockwise-directed retaining structures.

* * * * *